United States Patent
Yach et al.

(10) Patent No.: US 7,502,962 B2
(45) Date of Patent: Mar. 10, 2009

(54) SYSTEM AND METHOD FOR RECOVERING FROM A SOFTWARE PROCESSING ERROR

(75) Inventors: David P. Yach, Waterloo (CA); Gerald Winton Lankford, Jr., Waterloo (CA); John F. A. Dahms, Waterloo (CA); Anthony F. Scian, Waterloo (CA); Sean E. Wilson, Branchton (CA)

(73) Assignee: Research In Motion Limited, Waterloo (CA)

( * ) Notice: Subject to any disclaimer, the term of this patent is extended or adjusted under 35 U.S.C. 154(b) by 576 days.

(21) Appl. No.: 11/085,881

(22) Filed: Mar. 22, 2005
(Under 37 CFR 1.47)

(65) Prior Publication Data
US 2006/0007905 A1   Jan. 12, 2006

Related U.S. Application Data

(60) Provisional application No. 60/555,608, filed on Mar. 23, 2004.

(51) Int. Cl.
*G06F 11/00* (2006.01)
(52) U.S. Cl. ............................ 714/21; 714/23
(58) Field of Classification Search .............. 714/21, 714/23
See application file for complete search history.

(56) References Cited

U.S. PATENT DOCUMENTS

| | | | |
|---|---|---|---|
| 4,045,661 A | 8/1977 | Antoine et al. | |
| 4,674,038 A * | 6/1987 | Brelsford et al. | 714/15 |
| 5,111,457 A | 5/1992 | Rabjohns et al. | |
| 5,630,047 A | 5/1997 | Wang | |
| 5,708,589 A | 1/1998 | Beauvais | |
| 6,460,070 B1 | 10/2002 | Turek et al. | |
| 6,691,250 B1 | 2/2004 | Chandiramani et al. | |
| 2003/0037089 A1 | 2/2003 | Cota-Robles et al. | |
| 2003/0088358 A1 * | 5/2003 | Takeuchi | 701/114 |

FOREIGN PATENT DOCUMENTS

EP     0770241 B1    10/2001

OTHER PUBLICATIONS

Chapter Five of C-Index/II, 1996.*
International Search Report of Application No. PCT/CA2005/000428, date of mailing Jul. 11, 2005—15 pgs.
Demsky, et al., "Automatic Detection and Repair of Errors in Data Structures," OOPSLA '03, Oct. 26-30, 2003, Anaheim, CA, US, Nov. 2003, pp. 78-95, vol. 38, No. 11.
Sinaki, "C-17A Mission Computer Internal Built-In Test and I-Level Fault Logging," Aerospace and Electronics Conference, 1993, Naecon 1993, Proceedings of the IEEE 1993 National Dayton, OH, US, May 24-28, 1993, New York, NY, US, IEEE, May 24, 1993, pp. 776-782.

* cited by examiner

*Primary Examiner*—Bryce P Bonzo
(74) *Attorney, Agent, or Firm*—Jones Day; Krishna K. Pathiyal; Robert C. Liang

(57) ABSTRACT

Systems and methods for recovering from software processing errors are provided. The systems and methods provide for the validation of data following the occurrence of a software processing error.

56 Claims, 10 Drawing Sheets

US 7,502,962 B2

SYSTEM AND METHOD FOR RECOVERING FROM A SOFTWARE PROCESSING ERROR

CROSS-REFERENCE TO RELATED APPLICATION

This application claims priority to and the benefit of U.S. Provisional Application Ser. No. 60/555,608, filed on Mar. 23, 2004, of which the entire disclosure (including any and all figures) is incorporated herein by reference.

BACKGROUND

1. Technical Field

This system relates generally to the field of communications, and in particular to error-recovery methods on mobile wireless communications devices ("mobile devices").

2. Discussion of Related Art

Mobile computing devices, such as laptop computers, personal data assistants (PDAs), and cellular telephones, are becoming commonplace in society. These mobile computing devices may run software including operating systems, virtual machines, and various applications that perform desired tasks such as task scheduling and electronic communications. The mobile computing devices may encounter software processing errors during operation. However, present error handling techniques are inefficient when such errors are encountered since the device cannot recover from the error except by performing a hard reset of the device.

SUMMARY

In accordance with the teachings provided herein, methods and systems for recovering from a large class of software processing errors are provided. For example, a method may include receiving an indication that a software processing error has occurred. A set of data created by a software process is accessed. Based upon the accessed data, data contents of a data storage unit are validated. The data contents of the data storage unit are used in subsequent operations if the data contents are validated.

As another example, a system may include an error state monitor configured to detect the presence of an error state indication and an initialization module that is configured to send a reset signal. A validation module is configured to receive a reset signal sent by the initialization module. The validation module accesses information relating to a state of data stored in a data storage unit and provides a result of the operation of the validation module to the initialization module.

DETAILED DESCRIPTION OF THE DRAWINGS

Figure 1:
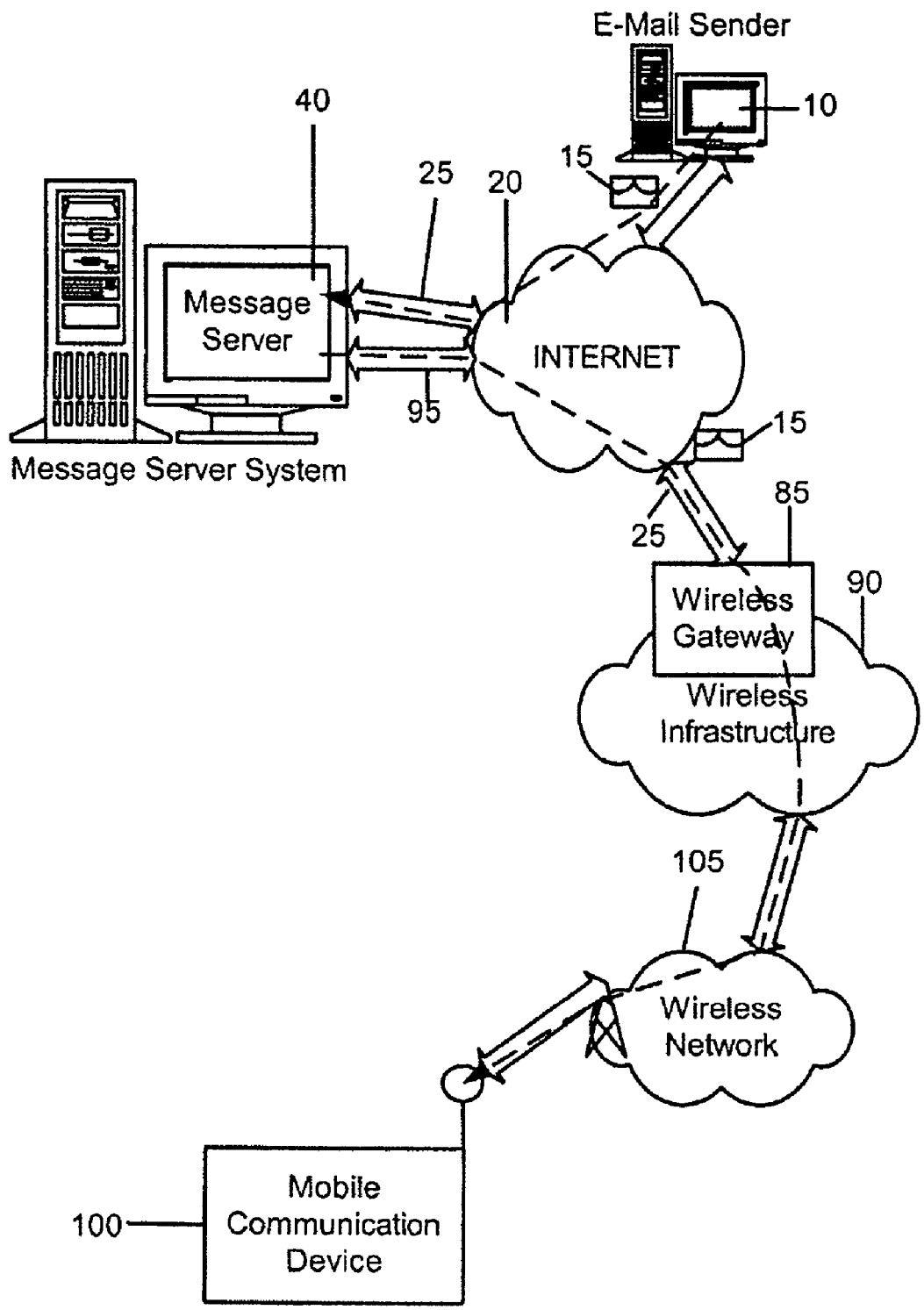
FIG. 1 is an overview of an example communication system in which a mobile device may be used.

The systems and methods disclosed herein for handling software processing errors may be implemented for use on a mobile device. FIG. 1 is an overview of an example communication system in which a mobile device may be used. The figure shows an e-mail sender 10 connected to a wide area network (WAN) which in this example, is the Internet 20. Also shown are an e-mail message 15, a message server system 40, a wireless gateway 85, a wireless infrastructure 90, a wireless network 105 and a mobile communication device 100.

The e-mail sender 10 may, for example, be connected to the Internet 20 through an Internet Service Provider (ISP) on which a user of the e-mail sender 10 has an account. Alternatively the e-mail sender 10 may be located within a company, connected to a local area network (LAN) which is connected to the Internet 20, or connected to the Internet 20 through a large application service provider (ASP).

The e-mail message 15 is sent by a user of the e-mail sender 10 to a user of the mobile communication device 100. Delivery of the e-mail message 15 is accomplished with the use of the message server 40 and other components. The message server 40 may be implemented, for example, to act as the main interface with the Internet 20. Although other messaging systems might not require the message server system 40, the mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail (not shown).

The wireless gateway 85 and the wireless infrastructure 90 provide a link between the Internet 20 and the wireless network 105. The wireless infrastructure 90 determines a most likely network for locating a given user and tracks the user as they roam between networks. A message is delivered to the mobile device 100 via wireless transmission, typically at a radio frequency (RF), from a base station in the wireless network 105 to the mobile device 100.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" specifically includes three different types of networks: (1) data-centric wireless networks, (2) voice-centric wireless networks and (3) dual-mode networks that can support both voice and data communications over the same physical base stations. Examples of combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
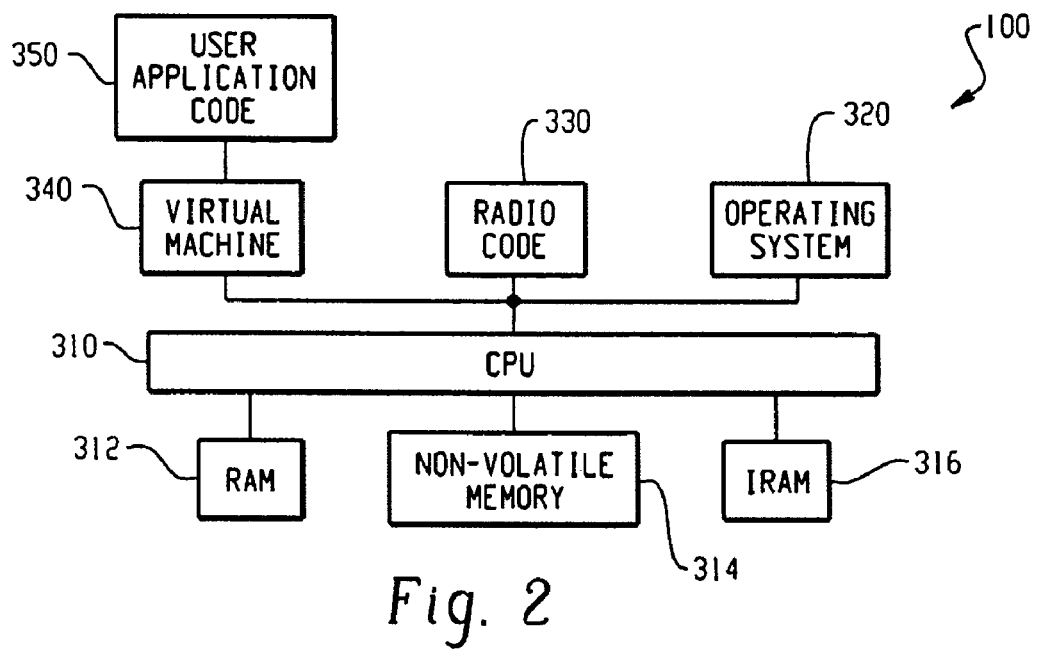
FIG. 2 is a block diagram depicting application code configured to operate on a mobile device.

FIG. 2 depicts application code (e.g., user application code 350) operating on a mobile device 100 that contains an error-handling system. A mobile device 100 can include a microprocessor 310 which is coupled (e.g., has a direct/indirect data communication pathway) to the RAM 312, the nonvolatile memory 314, and optionally a small amount of high-speed RAM (e.g., IRAM) 316. Examples of the non-volatile memory 314 are a Flash memory device, a magnetic RAM, a magnetic disk drive, a tape drive, or the like. The microprocessor 310 executes various software routines, including an operating system 320, a radio code module 330, and a virtual machine 340. Additionally, one or more user application modules 350 may execute on the virtual machine 340. The user application modules 350 may include such applications as electronic mail (e-mail) clients, scheduling applications, text entry, or another application that may allow a user to create, send, receive, or manipulate electronic data.

It is noted that FIG. 2 depicts certain components of a possible architecture and does not depict all components that may be included in such architecture. For example, architectures for mobile devices can vary based upon the desire to implement certain functional features, such as making a mobile device capable of handling both voice and data communications. The fact that other components are not depicted in the figures or discussed is in no way intended to limit the systems and methods or imply that other components cannot be included or the components shown cannot be excluded as part of the architecture of the example systems and methods. Correspondingly, one or more methods and systems disclosed herein may operate with fewer components than what is depicted in FIG. 2 depending upon the functionality needed for the methods and systems.

Figure 3:
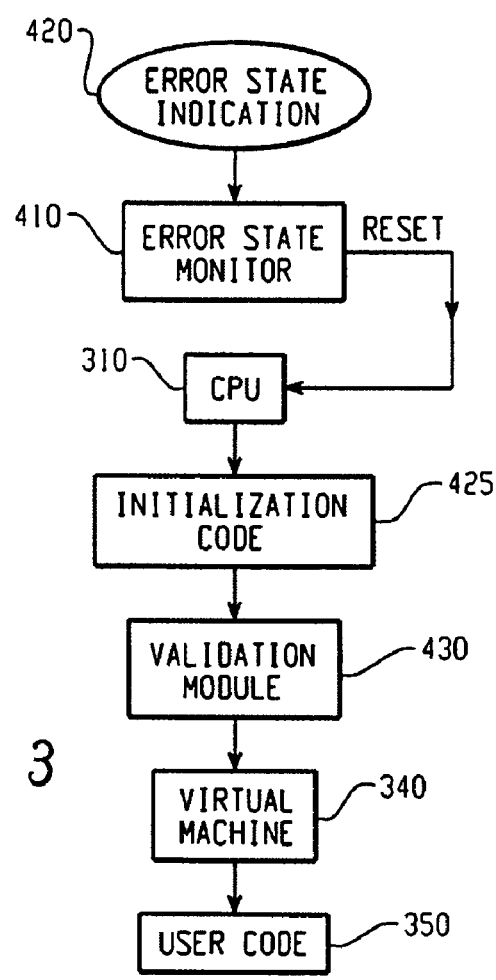
FIG. 3 is a block diagram depicting handling a processing error.

FIG. 3 depicts an exemplary configuration of a mobile device at a point near in time to when a software processing error occurs. An error state monitor 410 checks for the presence of a detectable software processing error by polling other components of the mobile device or by using other detection methods. The error state monitor 410 receives an error state indication 420. The error state monitor 410 may be implemented in either hardware or software. A possible hardware implementation of error state monitor 410 is as a watchdog monitor that periodically checks for responses from other hardware components, such as the microprocessor 310. A possible software implementation includes a module that repeatedly polls other software modules or processes and awaits responses from those polled modules or processes. Upon detection of an error state, the error state monitor 410 issues an instruction signal to other components to instruct the components receiving the instruction signal to perform an action. An action to be performed upon receiving an instruction signal from the error state monitor 410 includes a system reset.

Two types of system resets are discussed in connection with the mobile device. The first is a full system reset. In a full system reset, the mobile device is initialized by clearing the contents of the memory of the mobile device and beginning processing from a known or power-on state. Alternatively in a full system reset, the contents of the memory of the mobile device may not be cleared, but the contents are overwritten with contents provided during the full system reset procedure. A full system reset is the type of procedure that occurs when the mobile device is rebooted.

A second type of reset is called a fast reset. In a fast reset procedure, one or more consistency checks are performed as a way to ascertain the validity and/or integrity of the contents of the memory of the memory of the mobile device. Each check provides some indication as to whether the contents of the memory of the mobile device have been corrupted. In this example, if any of the results of a performed consistency check indicates that data corruption has occurred, the fast reset process ends and a full system reset is initiated. However, alternate approaches could use indications from a consistency check to correct data corruption or choose to ignore any corruption present to continue to complete a fast reset.

In this example, the error state monitor 410 detects when the mobile device has entered an error state. Error states include processing errors caused by both hardware malfunctions and software processing errors and specifically may include any hardware-detectable error or any non-recoverable software errors such as memory paging errors or infinite loops. When the error state monitor 410 detects an error state indication 420, the error state monitor 410 sends a reset signal to the microprocessor 310. In this example system, the reset signal from the error state monitor 410 does not affect the contents of data stored in volatile memory. Similarly, the reset signal does not affect the contents of non-volatile memory. The reset signal initiates a reset procedure as an attempt to get the mobile device out of a perceived error state.

Upon receipt of a reset signal, the microprocessor 310 enables the activation of an initialization module 425 which activates a validation module 430. The validation module 430 begins one or more consistency checks in attempts to ascertain whether the data in the memory of the mobile device (that comprises the virtual machine 340 and the user code 350) is valid (e.g., thereby warranting a fast reset) or if it has been corrupted (e.g., thereby warranting a full reset).

Figure 4:
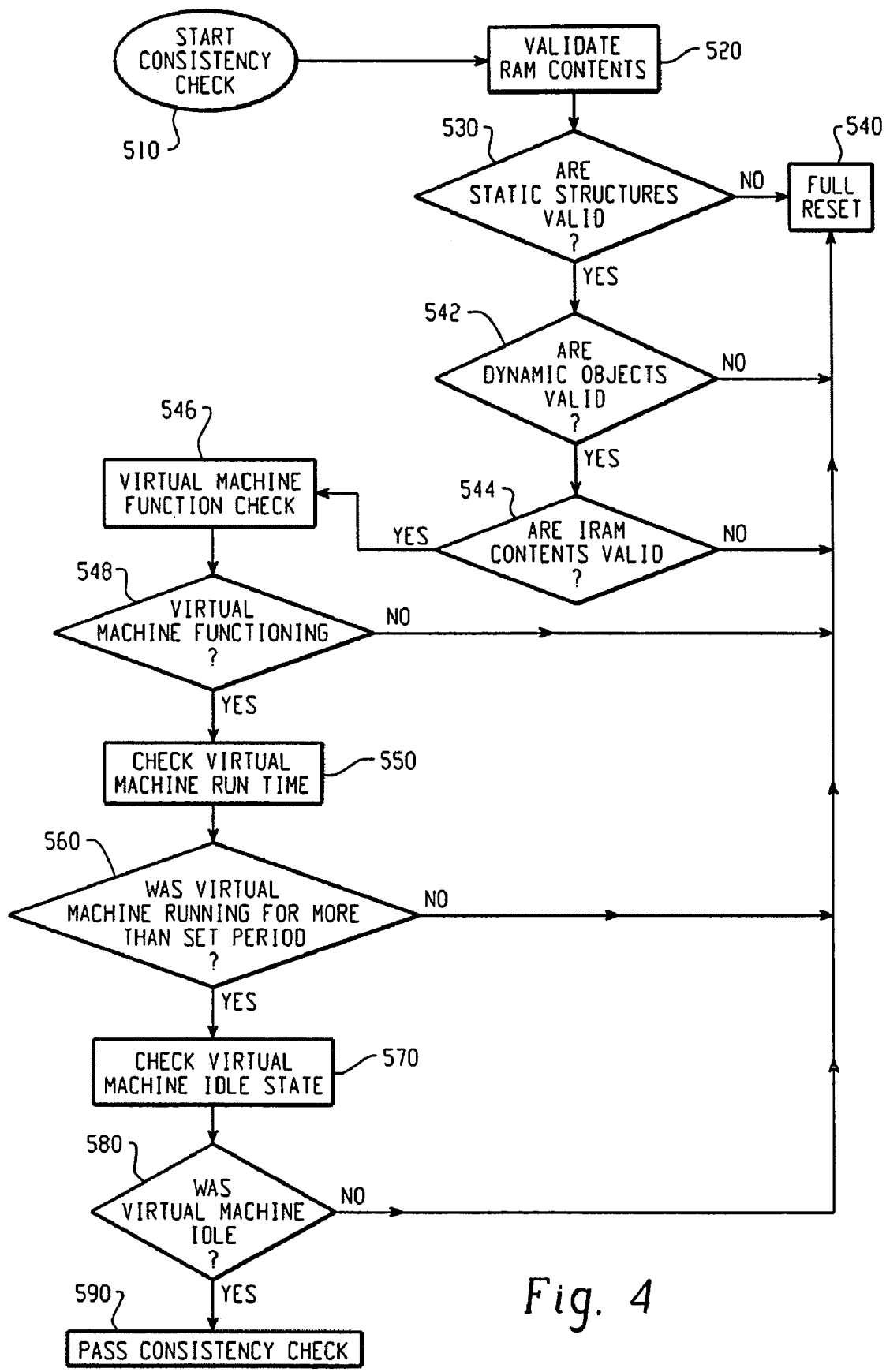
FIG. 4 is a flowchart depicting a reset procedure for a mobile device.

FIG. 4 depicts an example consistency check of data stored in volatile memory, usually a RAM such as RAM 312 and/or IRAM 316. At start block 510, the validation module 430 begins the consistency checks by checking static structures in the RAM 312. In the present example, the validation module 430 begins a data structure check on a data structure in the RAM 312 that represents the virtual machine 340. The virtual machine 340 which can be implemented via a Java virtual machine includes data markers that are incorporated into the data structure of the virtual machine 340. These markers have pre-selected values and occur at the beginning, in the middle, and at the end of the data structure. The pre-selected values of the markers are chosen in an attempt to minimize the probability that the pre-selected values were placed in the regions of the RAM 312 containing the markers by a system malfunction. In the present example, these markers are expected to appear at a set location in the RAM 312.

In the example being discussed, if a specific check is successful the consistency check process continues. If the data structure check fails, the consistency check process aborts. When the consistency check process is aborted, a full system reset is initiated by the initialization module 425. In a full system reset, all software processes are terminated and the device is rebooted. A full system reset may or may not cause data loss, depending on the particular functions being performed and other factors at the time a full system reset is initiated. The full system reset process may include resetting and/or replacing the contents of the RAM 312. The discussed examples follow a general procedure of continuing consistency checks upon determining whether tests are successful and aborting consistency checks to perform a full system reset upon determining that a test has failed.

At process block 520, the validation of the contents of the RAM 312 begins. The validity of static structures in the RAM 312 is checked at decision block 530. If the static structures are not determined to be valid, the consistency check fails at process block 540 and a full system reset is performed. If the static structures in the RAM 312 are validated, processing continues at decision block 542 by checking the validity of dynamic objects in the RAM 312. Failure to validate dynamic objects in the RAM 312 results in a full reset of the mobile device at process block 540. If the dynamic objects are validated, the consistency check continues with a check of the contents of the IRAM 316.

At decision block 544, a determination is made whether the contents of the IRAM 316 are valid. If the contents of the IRAM 316 are not determined to be valid, a full system reset occurs at process block 540. If validation is successful, the consistency check continues at process block 546 where a check is made of the functioning of the virtual machine 340. At decision block 548, a determination is made whether the virtual machine 340 was functioning properly. If the virtual machine 340 was not properly functioning, a full reset is performed at process block 540. If the virtual machine 340 was found to be functioning properly, processing continues at process block 550 to check the running time of the virtual machine 340. Decision block 560 depicts a check of whether the virtual machine 340 was operating for more than a set period of time. If not, processing continues at process block 540 where a full system reset occurs. If yes, processing continues at process block 570 where the idle state of the virtual machine 340 is checked.

Decision block 580 determines whether the virtual machine 340 was idle at the point when the error state indication 420 was detected. This check may be performed by modifying the virtual machine 340 so that it sets a state flag in memory when it begins executing and clears the flag when entering an idle state. The state of the virtual machine 340 can then be determined by checking the status of the state flag. As depicted by decision block 580, if the virtual machine 340 was not idle when the error state indication 420 was detected, a full reset of the mobile device is performed at process block 540. If the virtual machine 340 was idle, the consistency check passes and post-check processing occurs.

Figure 5A:
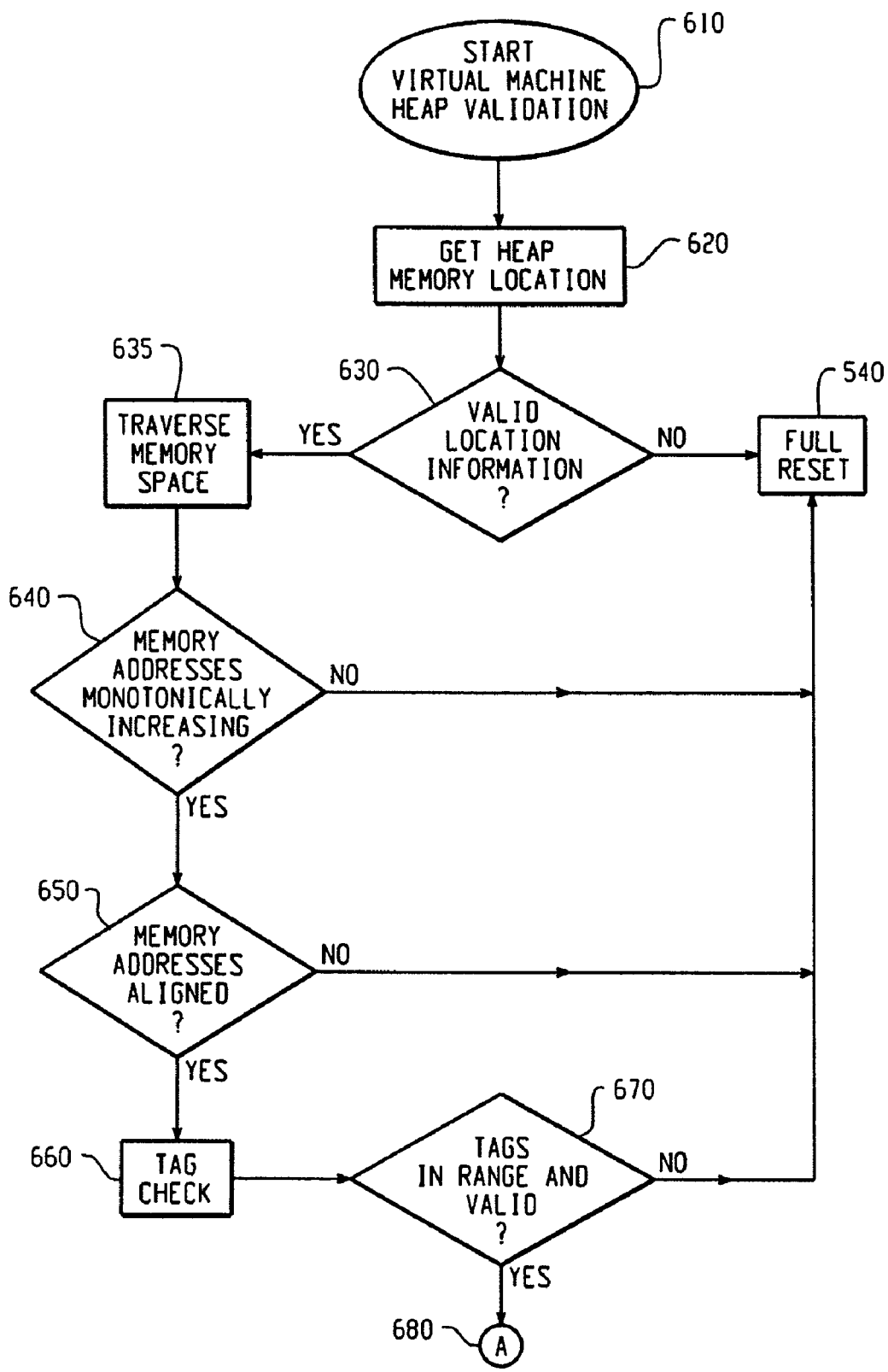
FIGS. 5a and 5b are flowcharts depicting an example procedure to validate contents of data in the heap of a virtual machine.

FIG. 5a is a flowchart that depicts a process of validating static structures in the RAM 312 in more detail. The validation process begins at start block 610. At process block 620, the memory addresses for the beginning and ending memory blocks in the RAM 312 containing a portion of the virtual machine 340 called the heap are obtained from the operating system 320. In the current example, objects like the virtual machine 340 are placed in the same locations in the RAM 312. Therefore, the addresses of the beginning and ending blocks of the heap of the virtual machine 340 can be obtained by querying the operating system 320. The mobile device may use a tagged memory system so that additional checks may be performed by checking the tag of a specific portion of the RAM 312.

Decision block 630 determines whether the beginning address obtained from the operating system 320 is part of the heap of the virtual machine 340. If not, a full reset occurs at process block 540. If yes, processing continues at process block 635 where the memory space of the heap is traversed. At decision block 640, a determination is reached whether the addresses of the traversed memory of the heap are monotonically increasing. If not, a full reset is performed at process block 540. If yes, a determination is made at decision block 650 whether the addresses of the traversed memory are properly aligned. If not, a full reset is performed at process block 540. If yes, then processing continues at process block 660 where a check of the memory tags is performed. Tags are checked to ensure that all tags are within a set of acceptable values, that no tag identifiers are duplicated, and that all tags are accounted for. If those determinations are successful at decision block 670, processing continues at continuation block 680. If not, a full reset occurs at process block 540.

Figure 5B:
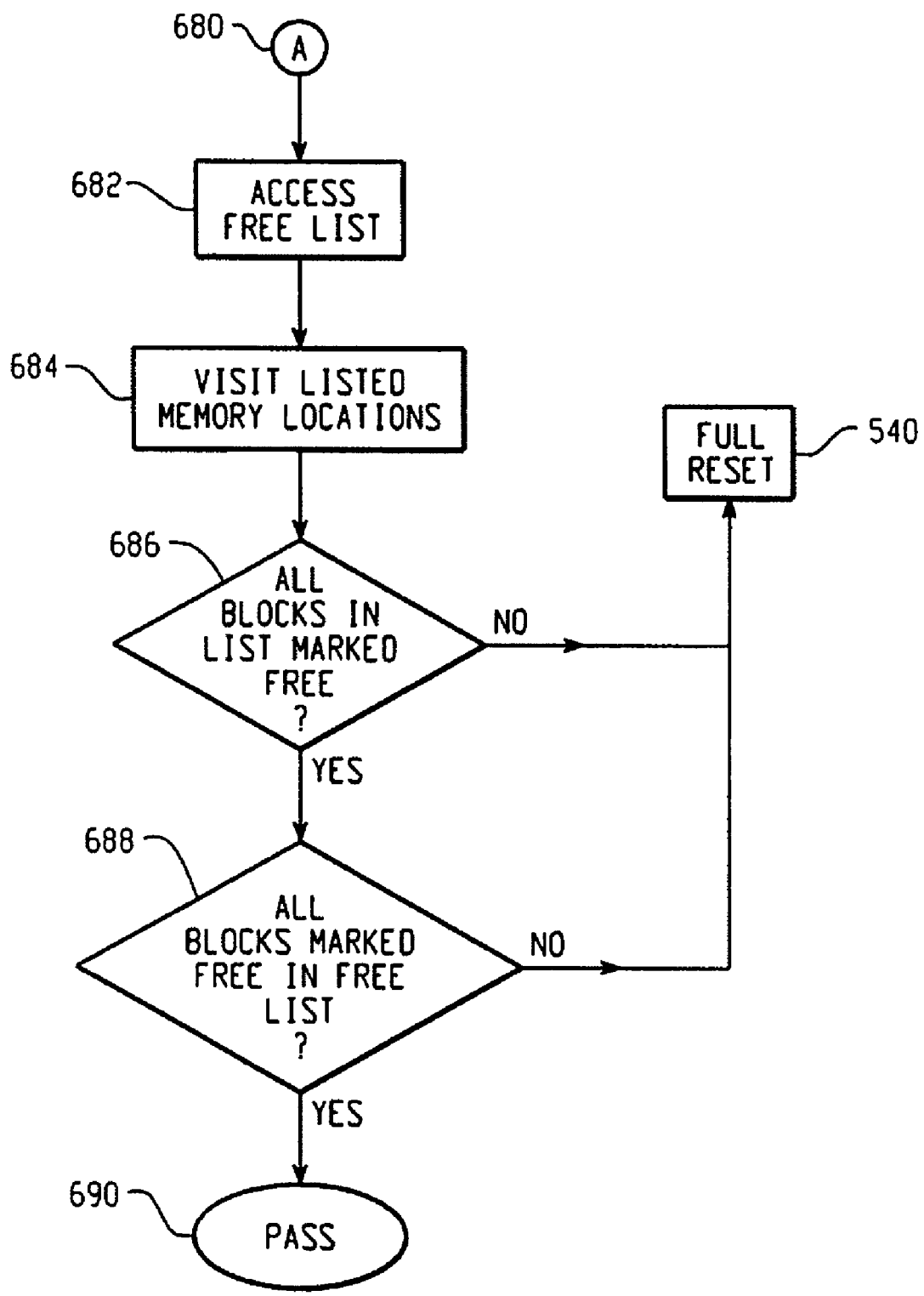

FIG. 5b is a flowchart that depicts the continuation of the heap validation process from continuation block 680. At process block 682, the free list of the virtual machine 340 is accessed. The thread free list is a list of threads of the virtual machine 340 that were not in use at the time the error state indication 420 was detected. Process block 684 depicts the processing of a check of a free list. All entries in the free list are checked by visiting a corresponding address in the RAM 312 to ensure that designated blocks in the RAM 312 are actually free. Additionally, blocks in the RAM 312 that are marked as free are checked to see whether those blocks appear in the free list. Decision block 686 determines whether all blocks listed in the free list are actually marked as free in the RAM 312 and decision block 688 determines whether blocks marked as free appear in the free list. If either determination from decision blocks 686 or 688 is no, a full reset is performed at process block 540. If both determinations are affirmative, a result that the validation was successful is reached at end block 690.

Figure 6:
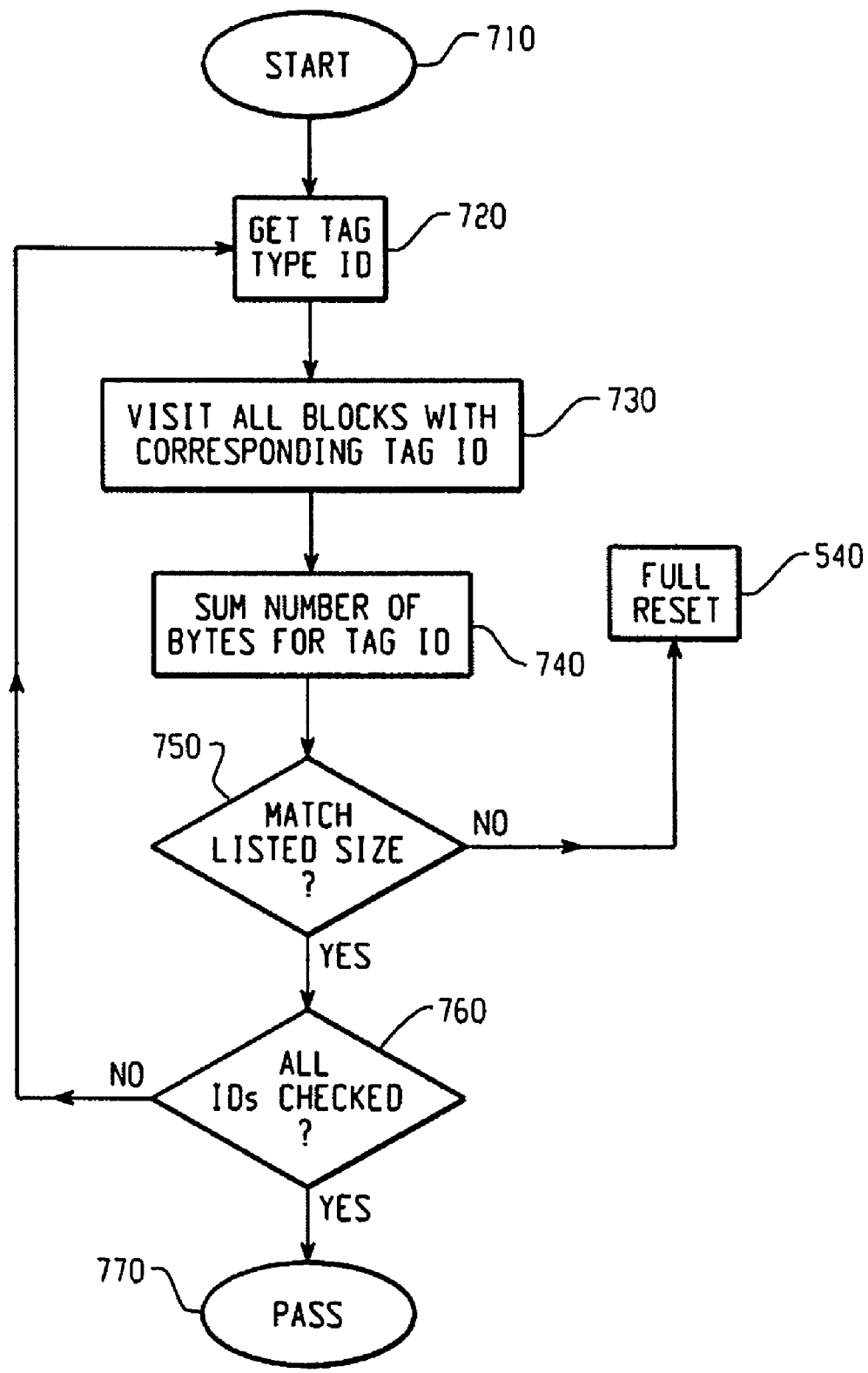
FIG. 6 is a flowchart depicting an example procedure to validate contents of data in a memory device.

FIG. 6 is a flowchart depicting a verification process of the tag list of the mobile device. Processing begins at start block 710 and continues at process block 720 where a tag identifier is obtained. At process block 730, all blocks in the RAM 312 with a corresponding tag identifier are visited and a sum is calculated in process block 740 that represents the total memory allocation for a corresponding tag identifier. Decision block 750 compares the sum to a value from the tag list that represents how much memory the virtual machine 340 has listed as allocated for a corresponding tag identifier. If the sum does not match the value from the tag list, a full reset of the mobile device is performed at process block 540. If the sum and the value match, decision block 760 depicts that a determination is made whether all tag identifiers have been checked. If not, the process is repeated for any remaining tag identifiers until each tag identifier has been checked. Upon successful completion for all tag identifiers, end block 770 depicts that the present check has been passed.

Figure 7:
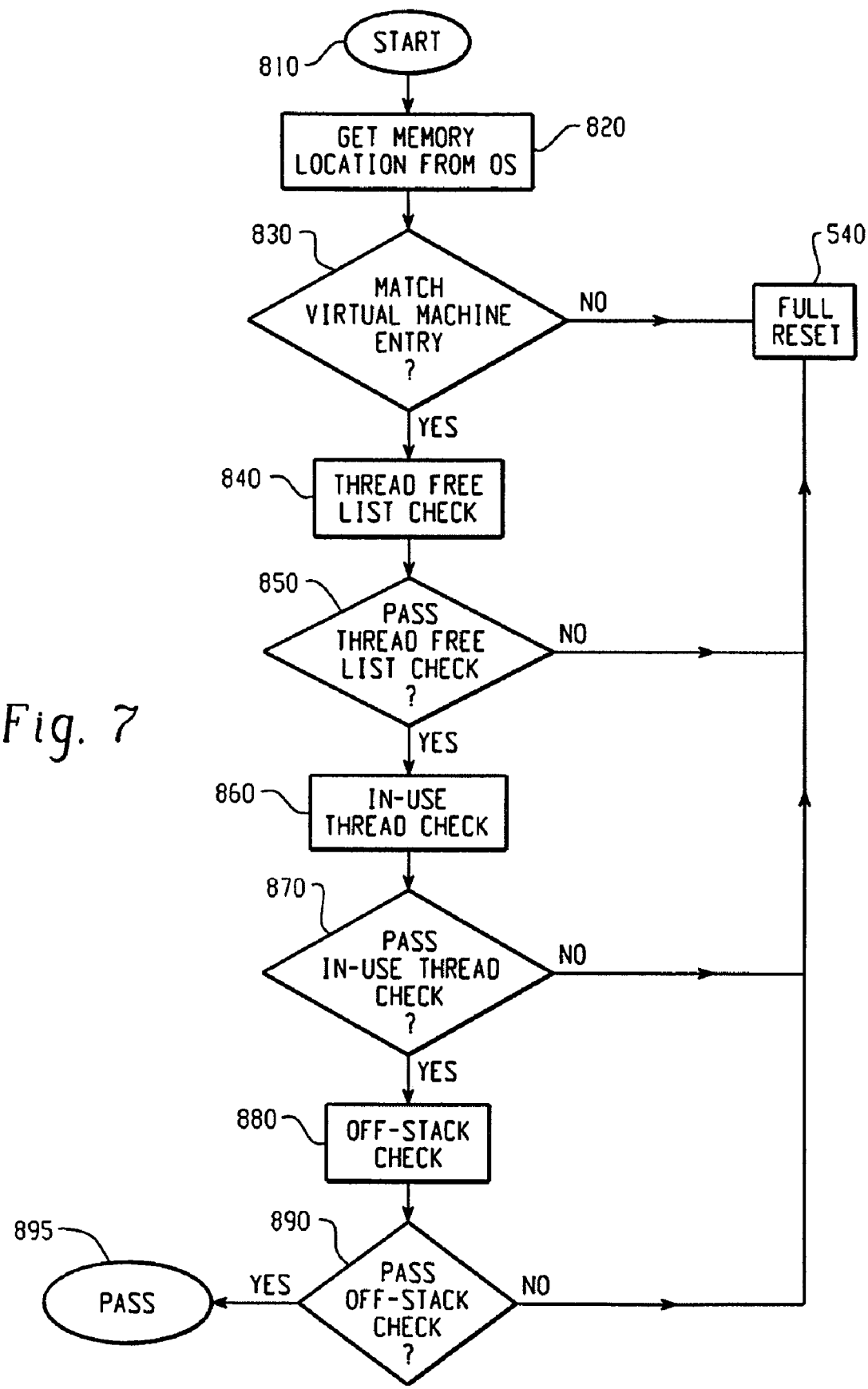
FIG. 7 is a flowchart depicting an example procedure to validate the contents of data structures in a virtual machine.

FIG. 7 is a flowchart depicting a consistency check, if needed, for the contents of the IRAM 316. Processing begins at start block 810 and continues at process block 820. At process block 820, the locations of the beginning and ending addresses of the IRAM 316 are obtained by querying the operating system 320 of the mobile device. At decision block 830, the addresses obtained at process block 820 are compared to the IRAM addresses stored by the virtual machine 340. If the addresses do not match, processing continues with a full system reset of the mobile device at process block 540. If the addresses match, processing continues at process block 840 with a check of a thread free list of the virtual machine 340. The thread free list is a list of threads of the virtual machine 340 that were not in use at the time the error state indication 420 was detected. The thread free list check includes comparisons or examinations, based upon information from the virtual machine 340, to verify that threads listed as free by the virtual machine 340 are in fact free and point to another free thread.

The free thread list may also be examined to verify that memory addresses for free threads are located within the memory space allocated to the IRAM 316. During these checks, as with previously described checks, a processing algorithm is used to ensure that processing does not stall because of an infinite loop or cycle. Decision block 850 examines the thread free list check performed at process block 840. Failure to satisfy conditions of the free thread check results in processing continuing with a full system reset at process block 540. Successful completion results in processing continuing at process block 860 with a check of in-use threads.

In-use thread checks by process block 860 include memory location checks similar to those performed for the free threads. Thread identifiers may also be checked to verify that all identifiers have been appropriately accounted-for by the virtual machine 340, including checks to verify that all thread identifiers are used, that no two threads have the same identifier, and that each thread is appropriately marked as either "free" or "in-use." Decision block 870 depicts the results of the determination made based upon processing in-use thread checks. Failure to satisfy conditions of the checks results in a full system reset at processing block 540 and successful completion allows processing to continue at process block 880.

Process block 880 depicts the processing of off-RAM checks. Off-RAM checks are examinations of information associated with memory locations allocated in the IRAM 316. The off-RAM checks include comparisons of information from locations in the IRAM 316 with information from the virtual machine 340 such as memory location ownership by threads and/or the size of memory space allocated to a thread. Also checked are the beginning and ending locations of memory allocations for threads and that the current position of the execution of a thread is within the beginning and ending positions of the thread's memory allocation. Decision block 890 depicts the results of a determination based on the processing of off-RAM checks. Failure to satisfy conditions of the checks results in a full system reset at processing block 540 and successful completion results in the termination of off-RAM checks at end block 895.

Figure 8:
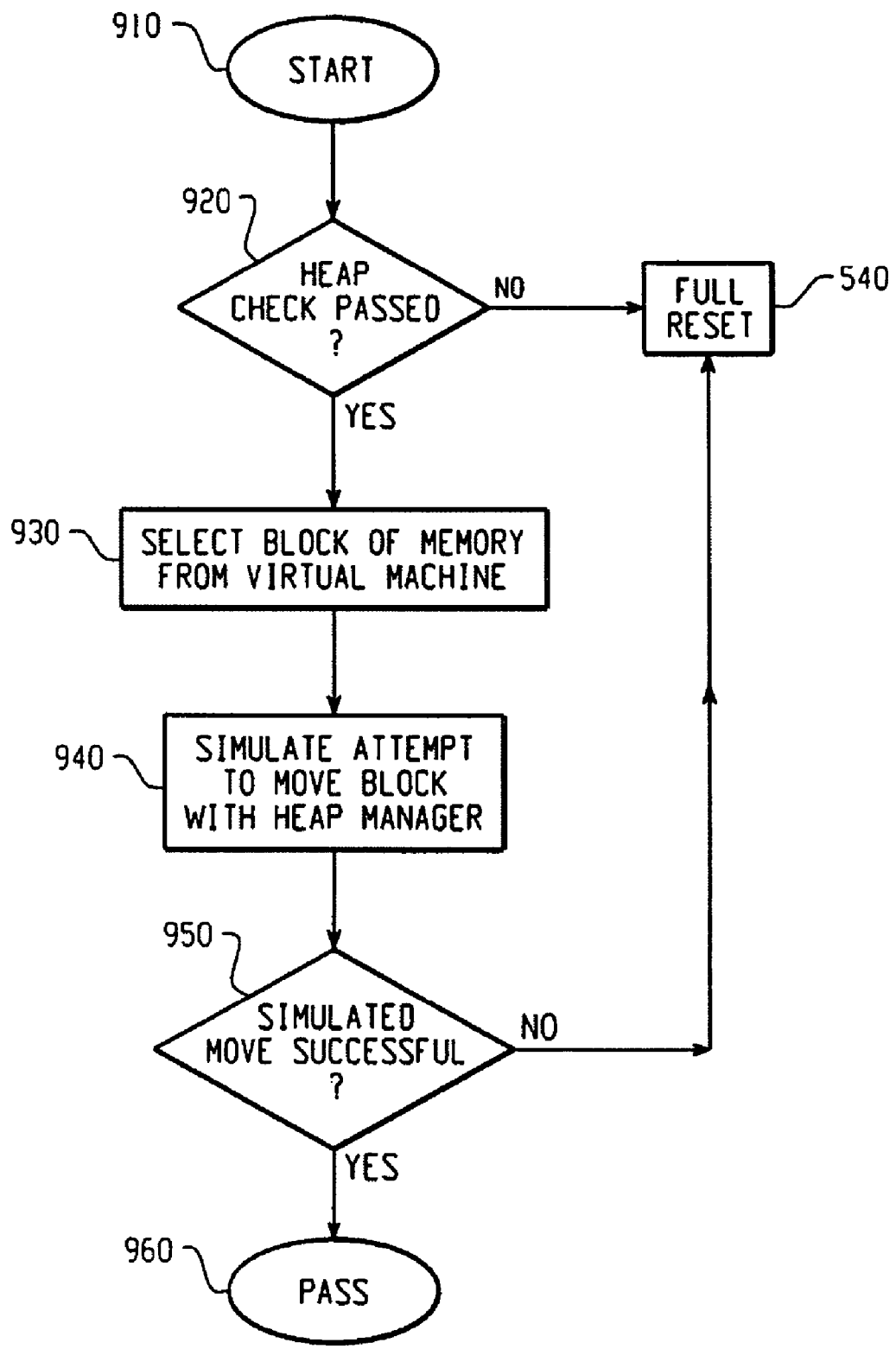
FIG. 8 is a flowchart depicting an example procedure to check the functionality of a virtual machine.

FIG. 8 is a flowchart depicting another check of a virtual machine involving a relocating heap manager. The relocating heap manager has the capability to access and move data so that free memory areas can be accumulated and formed into contiguous blocks. Processing begins at start block 910. Decision block 920 shows that in order for this check to proceed, a check of the heap, previously described, has to have passed. If a prior heap check has not been successful, a full system reset of the mobile device is performed at process block 540. If a prior heap check was successful, processing occurs at process block 930 where a block of memory associated with or used by the virtual machine 340 is selected. At process block 940, an attempt to move a block of memory is simulated with the relocating heap manager. Successful block moves to a different location in memory find and change pointers to the old block location. By recording whether old pointers were found, one can make use of this "ownership" information to check every heap block to ensure its address has been recorded and preserved after the reset condition was detected. If a determination made at decision block 950 indicates that the simulated move was not successful, processing continues by performing a full system reset of the mobile device at process block 540. If successful, processing of this step terminates at end block 960. This memory-move test may be performed a single time or repeated as many times as required, such as repeating for every allocated block in the relocating heap.

Figure 9:
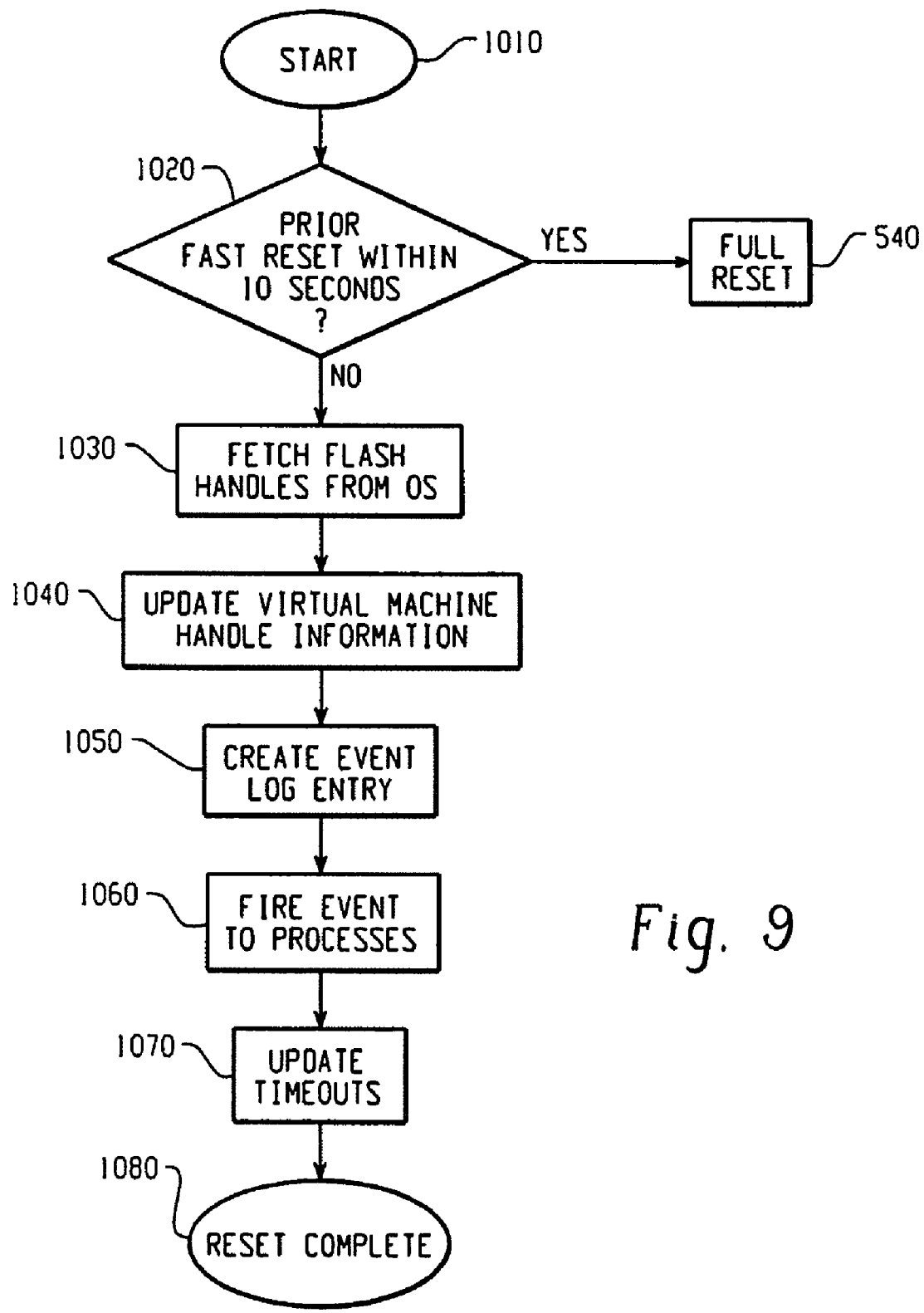
FIG. 9 is a flowchart depicting an example of post-validation processing.

FIG. 9 is a flowchart depicting post-testing operations performed upon the successful completion of prior validation checks. Processing begins at start block 1010 and continues at decision block 1020. At decision block 1020, a determination is made whether a prior fast reset procedure has been performed within a set time period. In the current example, that time period is ten seconds. Other time periods may be chosen as appropriate for other specific implementations of the systems and procedures described herein. Time periods may be computed by checking log entries, by tracking processor cycles, clock ticks or another method of timekeeping in a computing environment. If a prior fast reset has occurred within the preceding ten seconds, processing continues by performing a full system reset at process block 540. If more than the set period of time has elapsed since the last-occurring fast reset procedure, post-testing operations proceed at process block 1030 wherein a query is made of the operating system 320 to obtain flash handle information from the operating system 320. Once the flash handle information has been obtained, processing continues at process block 1040 where the flash memory handle information of the virtual machine 340 is updated with the information obtained from the operating system 320. At process block 1050, a log entry for the fast reset process is created. Such log entries can be time stamped and used as a data source for the determination made in decision block 1020.

At process block 1060, an event is sent to the processes in the system to inform those processes that a fast reset has occurred. In this example, the detection of the error state indication 420 began a process that effectively attempts to determine with some level of confidence whether data in the memory areas of the mobile device has been corrupted and can be discarded or whether that data is valid and can be used for further processing. The checks described in this example may be performed in conjunction to provide increasing levels of confidence that such data is valid by checking known attributes of the data or metadata and performing appropriate comparisons. In this example, there remains a possibility that all checks could be successful but that data corruption or other problems remain and are undetected. The determination made at decision block 1020 prevents the mobile device from engaging in an infinite loop of fast reset procedures.

As the operation of the mobile device resumes following a fast reset, the execution of threads and other processes can be adjusted to account for the occurrence of a fast reset. For example, the execution of a thread may have been suspended while it awaited some event that a fast reset has prevented. The event sent at process block 1060 informs threads that any awaited event will not occur and that initiating requests should be resent. At process block 1070, timeout values for threads are adjusted to take the effects of a fast reset into account. The fast reset complete process is complete at end block 1080.

The systems and methods described herein are intended to be examples only. Those of skill in the art may effect alterations, modifications and variations to the particular embodiments without departing from the scope of the invention which is defined by claims. For example, data signals transmitted using a communication channel may be used with the systems and methods. The data signals can include any type of data or voice information, such as an encoded message provided to a mobile device. The data signal may be packetized data that is transmitted through a carrier wave across the network. Still further computer-readable media may be used that is capable of causing a mobile device to perform the methods disclosed herein.

It should be understood that the checking processes may include one or multiple of the checks described herein and could include other checks, such as if a reference array is used to manage objects in memory, then checks of the reference array could be used. This type of check could use information about objects in memory obtained from the reference array and compare it with information about objects obtained from memory locations in the RAM 312, the non-volatile memory 314, or the IRAM 316. Any inconsistencies noted during the check could be used to determine whether a full or fast reset is warranted. The contents of the reference array form a particularly good consistency check since the reference array points to the object in memory and when this is coupled with object layouts in memory that encode redundant information about the reference array, the circularity provides an extra validation of a large amount of memory contents.

The fast reset process discussed in the examples provides different approaches to validating the data contents of a mobile device. Each approach can be independent of each other approach. By combining approaches, a higher level of confidence that data has not been corrupted can be achieved than what is possible through the use of a single approach alone. However, it is within the scope of this disclosure that an implementation of the fast reset process may use only a single approach.

Figure 10:
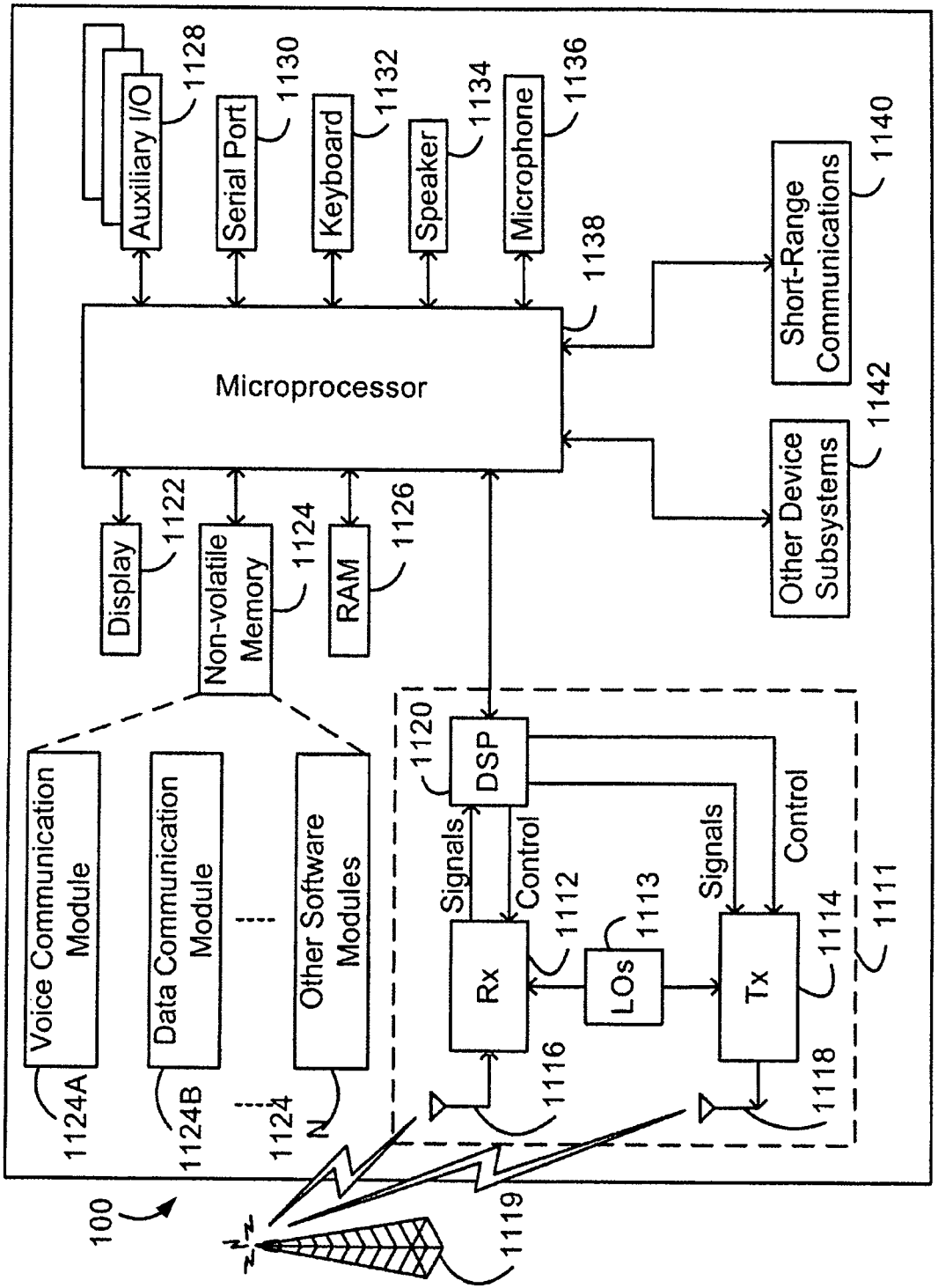
FIG. 10 is a block diagram of an example mobile device.

As another example, the systems and methods disclosed herein may be used with many different types of mobile devices. FIG. 10 depicts an example of a wireless mobile communication device. In FIG. 10, a wireless mobile communication device 1100 is depicted as a dual-mode mobile device. The term dual-mode refers to the ability of the wireless mobile communication device 1100 to handle voice and data communications. Wireless mobile communication device 1100 includes a transceiver 1111, a microprocessor 1138, a display 1122, non-volatile memory 1124, random access memory (RAM) 1126, intelligent RAM (IRAM) 1127, one or more auxiliary input/output (I/O) devices 1128, a serial port 1130, a keyboard 1132, a speaker 1134, a microphone 1136, a short-range wireless communications sub-system 1140, and other device sub-systems 1142.

The transceiver 1111 includes a receiver 1112, a transmitter 1114, antennas 1116 and 1118, one or more local oscillators 1113, and a digital signal processor (DSP) 1120. The antennas 1116 and 1118 may be antenna elements of a multiple-element antenna, and are preferably embedded antennas. However, the systems and methods described herein are in no way restricted to a particular type of antenna, or even to wireless communication devices.

The mobile device 1100 is preferably a two-way communication device having voice and data communication capabilities. Thus, for example, the mobile device 1100 may communicate over a voice network, such as any of the analog or digital cellular networks, and may also communicate over a data network. The voice and data networks are depicted by a communication tower 1119. These voice and data networks may be separate communication networks using separate infrastructure, such as base stations, network controllers, etc., or they may be integrated into a single wireless network.

The DSP 1120 is used to send and receive signals and control information to and from the receiver 1112 and the transmitter 1114. If the voice and data communications occur at a single frequency, or closely-spaced sets of frequencies, then a single local oscillator 1113 may be used in conjunction with the receiver 1112 and the transmitter 1114. Alternatively, if different frequencies are utilized for voice communications versus data communications for example, then a plurality of local oscillators 1113 can be used to generate a plurality of frequencies corresponding to the voice and data networks 1119. Information, which includes both voice and data information, is communicated to and from the transceiver 1111 via a link between the DSP 1120 and the microprocessor 1138.

The detailed design of the transceiver 11134, such as frequency band, component selection, power level, etc., will be dependent upon the communication network 1119 in which the mobile device 1100 is intended to operate. For example, a mobile device 1100 intended to operate in a North American market may include a transceiver 1111 designed to operate with any of a variety of voice communication networks, such as the Mobitex or DataTAC mobile data communication networks, AMPS, TDMA, CDMA, PCS, etc. A mobile device 1100 intended for use in Europe may be configured to operate with the GPRS data communication network and the GSM voice communication network. Other types of data and voice networks, both separate and integrated, may also be utilized with a mobile device 1100.

Depending upon the type of network or networks 1119, the access requirements for the mobile device 1100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will usually be unable to carry out any functions involving communications over the data network 1119, other than any legally required operations, such as '911' emergency calling.

After any required network registration or activation procedures have been completed, the mobile device 1100 may the send and receive communication signals, including both voice and data signals, over the networks 1119. Signals received by the antenna 1118 from the communication network 1119 are routed to the receiver 1112, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1120. In a similar manner, signals to be transmitted to the network 1119 are processed, including modulation and encoding, for example, by the DSP 1120 and are then provided to the transmitter 1114 for digital to analog conversion, frequency up conversion, filtering, amplification and transmission to the communication network 1119 via the antenna 1116.

In addition to processing the communication signals, the DSP 1120 also provides for transceiver control. For example, the gain levels applied to communication signals in the receiver 1112 and the transmitter 1114 may be adaptively controlled through automatic gain control algorithms implemented in the DSP 1120. Other transceiver control algorithms could also be implemented in the DSP 1120 in order to provide more sophisticated control of the transceiver 1111.

The microprocessor 1138 preferably manages and controls the overall operation of the mobile device 1100. Many types of microprocessors or microcontrollers could be used here, or, alternatively, a single DSP 1120 could be used to carry out the functions of the microprocessor 1138. Low-level communication functions, including at least data and voice communications, are performed through the DSP 1120 in the transceiver 1111. Other, high-level communication applications, such as a voice communication application 1124A, a data communication application 1124B, and other software modules 1124N may be stored in the non-volatile memory 1124 for execution by the microprocessor 1138. For example, the voice communication module 1124A may provide a high-level user interface operable to transmit and receive voice calls between the mobile device 1100 and a plurality of other voice or dual-mode devices via the network 1119. Similarly, the data communication module 1124B may provide a high-level user interface operable for sending and receiving data, such as e-mail messages, files, organizer information, short text messages, etc., between the mobile device 1100 and a plurality of other data devices via the networks 1119.

The microprocessor 1138 also interacts with other device subsystems, such as the display 11322, the RAM 1126, the IRAM 1127, the auxiliary input/output (I/O) subsystems 1128, the serial port 1130, the keyboard 1132, the speaker 1134, the microphone 1136, the short-range communications subsystem 1124A and any other device subsystems generally designated as 1142.

Some of the subsystems shown in FIG. 10 perform communication-related functions, whereas other subsystems may provide "resident" or on-device functions. Notably, some subsystems, such as the display 1122 and the keyboard 1132 may be used for both communication-related functions, such as entering a text message for transmission over a data communication network, and device-resident functions such as a calculator or task list or other personal data assistant (PDA) type functions.

Operating system software used by the microprocessor 1138 is preferably stored in a persistent store such as non-volatile memory 1124. The non-volatile memory 1124 may be implemented, for example, as a Flash memory component, or as battery backed-up RAM. In addition to the operating system, which controls low-level functions of the mobile device 1100, the non-volatile memory 1124 includes a plurality of software modules 1124A-1124N that can be executed by the microprocessor 1138 (and/or the DSP 1120), including a voice communication module 1124A, a data communication module 1124B, and a plurality of other operational modules 1124N for carrying out a plurality of other functions. These modules are executed by the microprocessor 1138 and provide a high-level interface between a user and the mobile device 1100. This interface typically includes a graphical component provided through the display 1122, and an input/output component provided through the auxiliary I/O 1128, keyboard 1132, speaker 1134, and microphone 1136. The operating system, specific device applications or modules, or parts thereof, may be temporarily loaded into a volatile store, such as RAM 1126 for faster operation. Moreover, received communication signals may also be temporarily stored in RAM 1126, before permanently writing them to a file system located in a persistent store such as the non-volatile memory 1124.

An exemplary application software module 1124N that may be loaded onto the mobile device 1100 is a personal information manager (PIM) application providing PDA functionality, such as calendar events, appointments, and task items. This software module 1124N may also interact with the voice communication module 1124A for managing phone calls, voice mails, etc., and may also interact with the data communication module for managing e-mail communications and other data transmissions. Alternatively, all of the functionality of the voice communication module 1124A and the data communication module 1124B may be integrated into the PIM module.

The non-volatile memory 1124 preferably also includes a file system to facilitate storage of PIM data items on the device. The PIM application preferably includes the ability to send and receive data items, either by itself, or in conjunction with the voice and data communication modules 1124A, 1124B, via the wireless networks 1119. The PIM data items are preferably seamlessly integrated, synchronized and updated, via the wireless networks 1119, with a corresponding set of data items stored or associated with a host computer system, thereby creating a mirrored system for data items associated with a particular user.

Context objects representing at least partially decoded data items, as well as fully decoded data items, are preferably stored on the mobile device 1100 in a volatile and non-persistent store such as the RAM 1126. Such information may instead be stored in the non-volatile memory 1124, for example, when storage intervals are relatively short, such that the information is removed from memory soon after it is stored. However, storage of this information in the RAM 1126 or another volatile and non-persistent store, such as IRAM 1127, is preferred, in order to ensure that the information is erased from memory when the mobile device 1100 loses power. This information loss prevents an unauthorized party from obtaining any stored decoded or partially decoded information by removing a memory chip from the mobile device 1100, for example.

The mobile device 1100 may be manually synchronized with a host system by placing the mobile device 1100 in an interface cradle, which couples the serial port 1130 of the mobile device 1100 to the serial port of a computer system or device. The serial port 1130 may also be used to enable a user to set preferences through an external device or software application, or to download other application modules 1124N for installation. This wired download path may be used to load an encryption key onto the device, which is a more secure method than exchanging encryption information via the wireless network 1119. Interfaces for other wired download paths may be provided in the mobile device 1100, in addition to or instead of the serial port 1130. For example, a USB or FireWire™ (IEEE 1394) port would provide an interface to a similarly equipped personal computer.

Additional application modules 1124N may be loaded onto the mobile device 1100 through the networks 1119, through an auxiliary I/O subsystem 1128, through the serial port 1130, through the short-range communications subsystem 1140, or through any other suitable subsystem 1142, and installed by a user in the non-volatile memory 1124, RAM 1126, or IRAM 1127. Such flexibility in application installation increases the functionality of the mobile device 1100 and may provide enhanced on-device functions, communication-related functions, or both. For example, secure communication applications may enable electronic commerce functions and other such financial transactions to be performed using the mobile device 1100.

When the mobile device 1100 is operating in a data communication mode, a received signal, such as a text message or a web page download, is processed by the transceiver module 1111 and provided to the microprocessor 1138, which preferably further processes the received signal in multiple stages as described above, for eventual output to the display 1122, or, alternatively, to an auxiliary I/O device 1128. A user of the mobile device 1100 may also compose data items, such as e-mail messages, using the keyboard 1132, which is preferably a complete alphanumeric keyboard laid out in the QWERTY style, although other styles of complete alphanumeric keyboards such as the DVORAK style may also be used. User input to the mobile device 1100 is further enhanced with a plurality of auxiliary I/O devices 1128, which may include a thumbwheel input device, a touchpad, a variety of switches, a rocker input switch, etc. The composed data items input by the user may then be transmitted over the communication networks 1119 via the transceiver module 1111.

When the mobile device 1100 is operating in a voice communication mode, the overall operation of the mobile device is substantially similar to the data mode, except that received signals are preferably be output to the speaker 1134 and voice signals for transmission are generated by a microphone 1136. Alternative voice or audio I/O subsystems, such as a voice message recording subsystem, may also be implemented on the mobile device 1100. Although voice or audio signal output is preferably accomplished primarily through the speaker 1134, the display 1122 may also be used to provide an indication of the identity of a calling party, the duration of a voice call, or other voice call related information. For example, the microprocessor 1138, in conjunction with the voice communication module and the operating system software, may detect the caller identification information of an incoming voice call and display it on the display 11322.

A short-range communications subsystem 1124A is also included in the mobile device 1100. The short-range communications subsystem 1124A may include an infrared device and associated circuits and components, or a short-range RF communication module such as a Bluetooth™ module or an 802.11 (WiFi) module, for example, to provide for communication with similarly-enabled systems and devices. Those skilled in the art will appreciate that Bluetooth, 802.11, and WiFi refer to specifications, or sets of specifications, available from the Institute of Electrical and Electronics Engineers (IEEE), relating to wireless personal area networks and wireless local area networks, respectively.

It is claimed:

1. A method for recovering from a software processing error, comprising the steps of
    receiving an indication that a software processing error has occurred;
    responsive to the indication, determining if data contents of a data storage unit are valid; and
    if the data contents of the data storage unit are valid, using the data contents in at least one subsequent operation,
    if the data contents of the data storage unit are not valid, performing a full system reset;
    checking operation of a virtual machine operating on a wireless mobile communications device; and
    determining whether to perform a full reset based upon the virtual machine checking.

2. The method for recovering from a software processing error of claim 1, where the software processing error occurs on a cellular telephone.

3. The method for recovering from a software processing error of claim 1, where the software processing error occurs on a personal data assistant.

4. The method for recovering from a software processing error of claim 1, where the software processing error occurs on a wireless mobile communications device.

5. The method for recovering from a software processing error of claim 1, wherein the indication that a software processing error has occurred is a signal initiated by hardware.

6. The method for recovering from a software processing error of claim 1, wherein the indication that a software processing error has occurred is a signal initiated by software.

7. The method for recovering from a software processing error of claim 1, wherein determining if the data contents of the data storage unit are valid comprises performing a data structure check on data in one or more memory locations.

8. The method for recovering from a software processing error of claim 1, wherein the data contents include static structures and dynamic objects.

9. The method for recovering from a software processing error of claim 1, further comprising the steps of:
    checking whether the virtual machine was idle;
    determining whether to perform a full reset based upon the virtual machine idle check.

10. The method for recovering from a software processing error of claim 1, further comprising the steps of:
    checking whether memory location information is valid based upon data related to heap memory location;
    determining whether to perform a full reset based upon the memory location check.

11. The method for recovering from a software processing error of claim 1, further comprising the steps of:
    checking a thread free list of the virtual machine;
    wherein the thread free list is a list of threads of the virtual machine that were not in use at about the time the error indication was detected;
    determining whether to perform a full reset based upon checking the free list.

12. The method for recovering from a software processing error of claim 1, further comprising the steps of:
    selecting a block of memory associated with the virtual machine;
    simulating an attempt to move the selected block;
    determining whether to perform a full reset based upon whether the simulated move was successful.

13. The method for recovering from a software processing error of claim 1, wherein the data storage unit comprises a volatile memory device.

14. The method for recovering from a software processing error of claim 1, further comprising the step of creating a reset indicator if the data contents of the data storage unit are not valid.

15. A computer-readable medium including instructions capable of causing a mobile device to perform the method of claim 1.

16. The method of claim 1, further comprising, if the data contents of the data storage unit are valid, performing a fast system reset.

17. The method of claim 16, wherein the fast system reset comprises creating a log entry for the fast reset process.

18. The method of claim 16, wherein the fast system reset comprises determining if a previous fast system reset occurred, and performing a full system reset if the previous fast system reset occurred.

19. The method of claim 16, wherein the fast system reset comprises informing processes that an event will not occur.

20. The method of claim 16, wherein the fast system reset comprises updating flash memory handle information of a virtual machine using information obtained from an operating system.

21. A system that provides for the recovery from a software processing error, comprising:
    an error state monitor configured to detect the presence of an error state indication;
    an initialization module configured to send a reset signal; and
    a validation module configured to receive a reset signal sent by the initialization module;
    wherein the validation module accesses information relating to a state of data stored in a data storage unit and provides a result of the operation of the validation module to the initialization module;
wherein the initialization module determines whether to perform a full system reset based on the result of the operation of the validation module;
wherein operation of a virtual machine operating on a wireless mobile communications device is checked; and
wherein a determination is made whether to perform a full reset based upon the virtual machine checking.

22. The system of claim 21, wherein the error state monitor is included in a wireless mobile communications device.

23. The system of claim 21, wherein the error state monitor is included in a personal data assistant or a cellular telephone.

24. The system of claim 21, wherein the error state monitor is a timer implemented in hardware.

25. The system of claim 21, wherein the error state monitor is a timer implemented in software.

26. The system of claim 21, wherein the information relating to the state of data comprises locations in a storage unit.

27. The system of claim 21, wherein the result comprises an indication that the data stored in the data storage unit has been successfully validated.

28. The system of claim 21, wherein the result comprises an indication that the data stored in the data storage unit has not been successfully validated.

29. A wireless mobile communications device that provides for the recovery from a software processing error, comprising:
means for receiving an indication that a software processing error has occurred;
means for determining whether data contents of a data storage unit are valid responsive to the indication;
means for using the data contents of the data storage unit in subsequent operations if the data contents are valid;
means for performing a full system reset if the data contents are not valid;
means for checking operation of a virtual machine operating on the wireless mobile communications device; and
means for determining whether to perform a full reset based upon the virtual machine checking.

30. A method for recovering from a software processing error, comprising the steps of
receiving an indication that a software processing error has occurred;
responsive to the indication, determining if data contents of a data storage unit are valid;
if the data contents of the data storage unit are valid, using the data contents in at least one subsequent operation,
if the data contents of the data storage unit are not valid, performing a full system reset, and
if the data contents of the data storage unit are valid, performing a fast system reset.

31. The method for recovering from a software processing error of claim 30, where the software processing error occurs on a cellular telephone.

32. The method for recovering from a software processing error of claim 30, where the software processing error occurs on a personal data assistant.

33. The method for recovering from a software processing error of claim 30, where the software processing error occurs on a wireless mobile communications device.

34. The method for recovering from a software processing error of claim 30, wherein the indication that a software processing error has occurred is a signal initiated by hardware.

35. The method for recovering from a software processing error of claim 30, wherein the indication that a software processing error has occurred is a signal initiated by software.

36. The method for recovering from a software processing error of claim 30, wherein determining if the data contents of the data storage unit are valid comprises performing a data structure check on data in one or more memory locations.

37. The method for recovering from a software processing error of claim 30 wherein the data contents include static structures and dynamic objects.

38. The method for recovering from a software processing error of claim 30, further comprising the steps of:
checking whether the virtual machine was idle;
determining whether to perform a full reset based upon the virtual machine idle check.

39. The method for recovering from a software processing error of claim 30, further comprising the steps of:
checking whether memory location information is valid based upon data related to heap memory location;
determining whether to perform a full reset based upon the memory location check.

40. The method for recovering from a software processing error of claim 30, further comprising the steps of:
checking a thread free list of the virtual machine;
wherein the thread free list is a list of threads of the virtual machine that were not in use at about the time the error indication was detected;
determining whether to perform a full reset based upon checking the free list.

41. The method for recovering from a software processing error of claim 30, further comprising the steps of:
selecting a block of memory associated with the virtual machine;
simulating an attempt to move the selected block;
determining whether to perform a full reset based upon whether the simulated move was successful.

42. The method for recovering from a software processing error of claim 30, wherein the data storage unit comprises a volatile memory device.

43. The method for recovering from a software processing error of claim 30, further comprising the step of creating a reset indicator if the data contents of the data storage unit are not valid.

44. A computer-readable medium including instructions capable of causing a mobile device to perform the method of claim 30.

45. The method of claim 30, wherein the fast system reset comprises creating a log entry for the fast reset process.

46. The method of claim 30, wherein the fast system reset comprises determining if a previous fast system reset occurred, and performing a full system reset if the previous fast system reset occurred.

47. The method of claim 30, wherein the fast system reset comprises informing processes that an event will not occur.

48. The method of claim 30, wherein the fast system reset comprises updating flash memory handle information of a virtual machine using information obtained from an operating system.

49. A system that provides for the recovery from a software processing error, comprising:
an error state monitor configured to detect the presence of an error state indication;
an initialization module configured to send a reset signal; and
a validation module configured to receive a reset signal sent by the initialization module;

wherein the validation module accesses information relating to a state of data stored in a data storage unit and provides a result of the operation of the validation module to the initialization module;

wherein the initialization module determines whether to perform a full system reset based on the result of the operation of the validation module; and wherein if the data contents of the data storage unit are valid, a fast system reset is performed.

50. The system of claim 49, wherein the error state monitor is included in a wireless mobile communications device.

51. The system of claim 49, wherein the error state monitor is included in a personal data assistant or a cellular telephone.

52. The system of claim 49, wherein the error state monitor is a timer implemented in hardware.

53. The system of claim 49, wherein the error state monitor is a timer implemented in software.

54. The system of claim 49, wherein the information relating to the state of data comprises locations in a storage unit.

55. The system of claim 49, wherein the result comprises an indication that the data stored in the data storage unit has been successfully validated.

56. The system of claim 49, wherein the result comprises an indication that the data stored in the data storage unit has not been successfully validated.

* * * * *